United States Patent [19]

Kang

[11] Patent Number: 5,675,217
[45] Date of Patent: Oct. 7, 1997

[54] COLOR ELECTROLUMINESCENT DEVICE AND METHOD OF MANUFACTURING THE SAME

[75] Inventor: Hai Yong Kang, Seoul, Rep. of Korea

[73] Assignee: LG Semicon Co., Ltd., Chungcheongbuk-do, Rep. of Korea

[21] Appl. No.: 569,741

[22] Filed: Dec. 8, 1995

[30] Foreign Application Priority Data

Dec. 8, 1994 [KR] Rep. of Korea ............... 33322/1994

[51] Int. Cl.$^6$ ............................................. H01J 1/62
[52] U.S. Cl. ............................................. 313/509; 313/503
[58] Field of Search ........................... 313/506, 509, 313/503, 511, 512, 498, 499

[56] References Cited

U.S. PATENT DOCUMENTS 4,777,402  10/1988  Mitsumori ........................ 313/509

*Primary Examiner*—Nimeshkumar Patel
*Attorney, Agent, or Firm*—Morgan, Lewis and Bockius, LLP

[57] ABSTRACT

A color EL device includes a substrate; a first electrode formed on the substrate; a first insulating layer formed on the first electrode; a phosphorous layer formed on the first insulating layer and having inserted therein one or more intermediate insulating layers; a second insulating layer formed on the said phosphorous layer; and a second electrode formed on the second insulating layer.

20 Claims, 4 Drawing Sheets

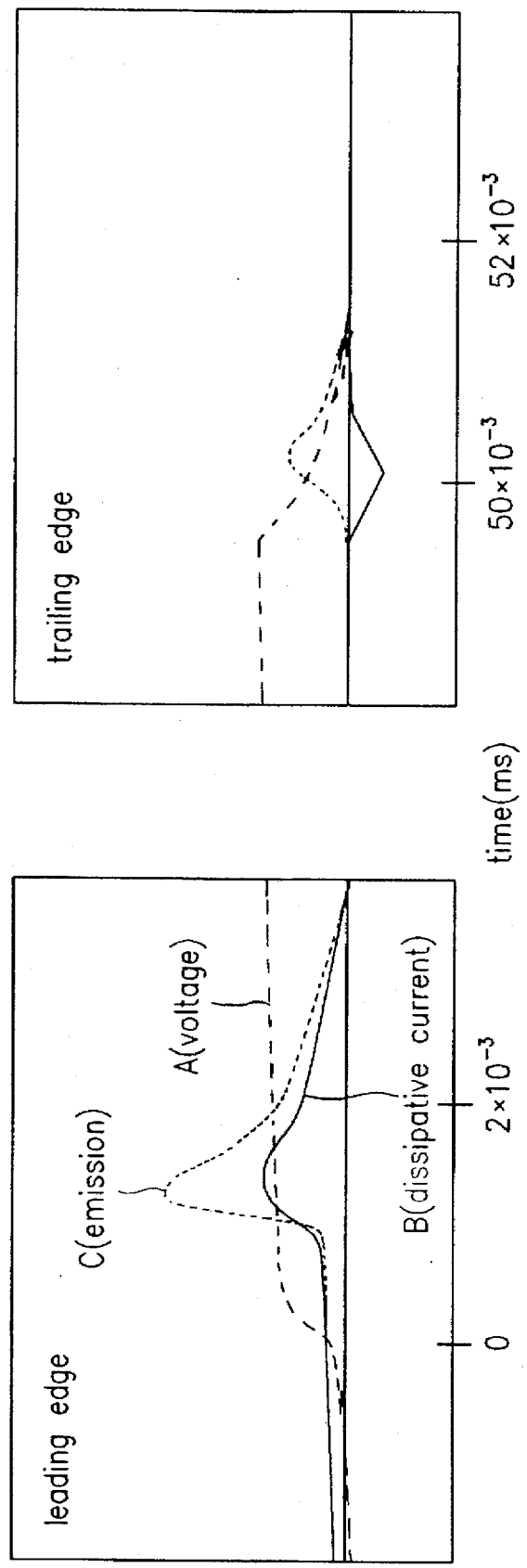

F I G.3a
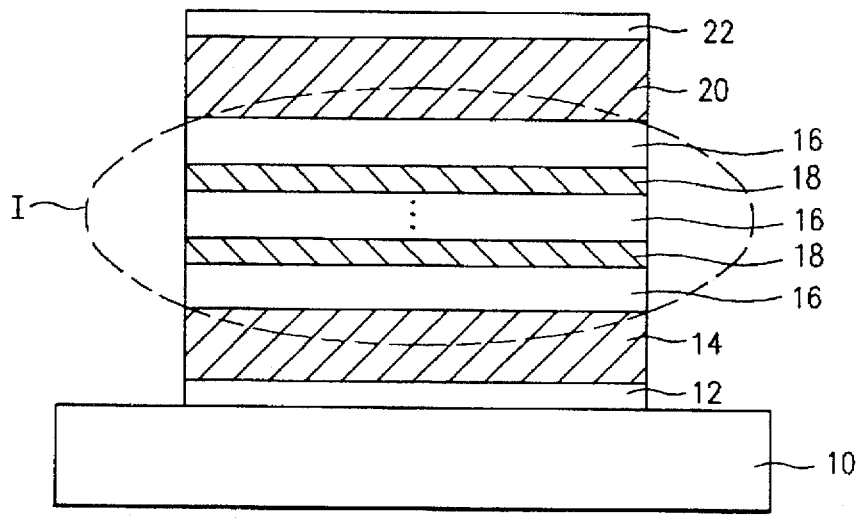
F I G.3b
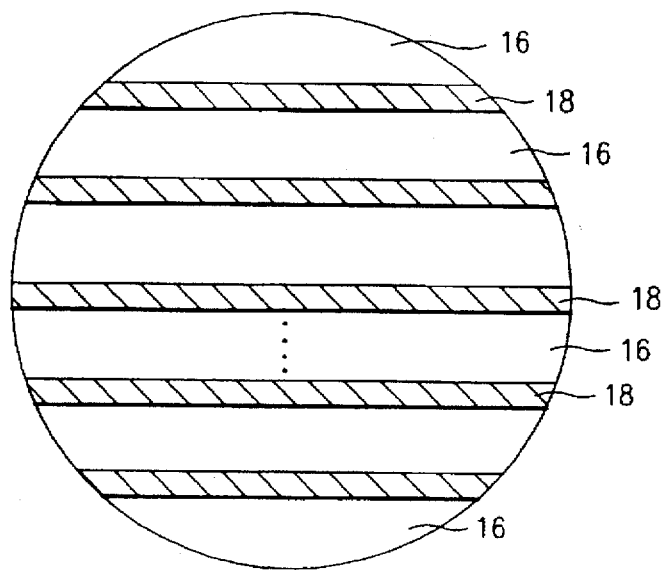

COLOR ELECTROLUMINESCENT DEVICE AND METHOD OF MANUFACTURING THE SAME

BACKGROUND OF THE INVENTION

1. Field of the Invention

The present invention relates to a display device, and more particularly, to an electroluminescent (EL) device that can emit blue color and a method of manufacturing the same.

2. Discussion of the Related Art

Generally, in EL display devices, phosphorous layers may be formed of different materials, with the choice of material depending on the desired luminescent color. ZnS and SrS are frequently used as host materials for phosphorous layers. Different elements are then added to the host layer depending on the desired colors to be obtained. If red is desired, Sn is added. If green is desired, Tb is added. If yellow is desired, Mn is added. If blue is desired, Ce is added. For red, green or yellow, Zns is used as the host material. For blue, SrS is used as the host material. In the current technology, EL display devices for red and green that use ZnS emit bright light. In contrast, an EL display device for blue has a significantly weak luminance.

A blue EL display will be discussed below with the attached drawings. FIG. 1 is a sectional view of a conventional SrS:Ce EL display device. FIG. 2 is a time-based graph describing the operation of an EL display device, in particular, the leading and trailing edges of functioning of the conventional SrS:Ce EL display device.

In a method of fabricating the conventional SrS:Ce EL device, and with reference to FIG. 1, a transparent conductive layer of indium tin oxide (ITO) is deposited on a glass substrate 1 and patterned using photolithography, thereby forming ITO layer 2. About 2,000 Å of $Ta_2O_5$ is deposited on ITO layer 2, thereby forming a first insulating layer 3. Subsequently, a phosphorous layer 4 of about 6,000 Å is deposited. The phosphorus layer 4 is the luminescent layer including a host material to which an element bringing out a color is added. About 2,000 Å of second insulating layer 5 is deposited on phosphorous layer 4. Here, where the desired color is blue, SrS:Ce (in which Ce is added to the host material SrS) is used as the luminescent layer.

Thereafter, aluminum is deposited on second insulating layer 5 and etched in a desired form, using photolithography, to form an upper electrode 6. In order to prevent the device from deteriorating due to moisture or oxidation, the device is sealed using silicon oil or backglass. The blue EL device is then complete.

In the conventional blue EL device having a double-insulating layer, an alternating voltage of about 200V is applied to opposite ends thereof. At this time, a high voltage is produced between phosphorous layer 4 and first and second insulating layers 3 and 5. Thus, electrons present on the interfaces between phosphorous layer 4 and insulating layers 3 and 5 are accelerated. During this procedure, energized electrons collide with luminescent element Ce resident within phosphorous layer 4. This is because the phosphorous layer is formed of SrS:Ce. As a result, the electrons' energy is transferred to luminescent element Ce, activating the surrounding electrons of luminescent element Ce. The activated electrons subsequently transit from the high energy level state to a base level state and energy corresponding to the energy difference between the activated state and base state is emitted as light energy. A luminescence of blue thereby occurs. The characteristics of the SrS:Ce EL device illuminating blue will be described below.

Blue has a wavelength of 470–480 mm. Through analysis of light of the predetermined wavelength, it is noted that the functioning of a conventional SrS:Ce EL device has leading and trailing edges as shown in FIG. 2. In FIG. 2, reference character A indicates voltage, B indicates dissipative current, and reference character C indicates the emission amount of light.

In case of using SrS:Ce as the phosphorous layer, the occurrence of leading and trailing edges coincide with the emission of light. The trailing edge is five times as efficient as the leading edge in light production.

When an electric field is applied to the EL device (i.e., at the leading edge), field cramping takes place in the phosphorous layer. In the high electric field resulting during the leading edge, luminescent element Ce is ionized, and the phosphorous layer is polarized by the electrons seized at the interfaces of the phosphorous layer 4 and the insulating layers 3 and 5.

During the trailing edge, and with reference to FIG. 2, the effective electric field is lowered in the phosphorous layer, resulting in an inversion of the electric field. The electrons seized at the interfaces are re-emitted into the phosphorous layer and migrate by diffusion to be ionized. The luminescent element atoms 3 attracts these electrons due to Coulomb's attraction, and when they collide, light is emitted. Thus, light appears at the trailing edge as well as the leading edge of the AC voltage cycle.

In the conventional SrS:Ce EL device, an interface between the phosphorous layer and an insulating layer is present only on both sides of the phosphorous layer. The magnitude of the trailing edge is far weaker than that of the leading edge. For this reason, as compared with red or green EL devices using ZnS as their phosphorous layers, the conventional blue EL device using SrS:Ce as its phosphorous layer is very weak in luminance. This involves difficulty in its application to a practical product. In addition, the product has a very low efficiency.

SUMMARY OF THE INVENTION

Accordingly, the present invention is directed to a color electroluminescent device and method of manufacturing the same that substantially obviates one or more of the problems due to limitations and disadvantages of the related art.

An object of the present invention is the provision of an EL device in which the interface between the phosphorous layer and insulating layers is expanded to increase the luminance and efficiency of a blue EL device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color EL device includes a substrate; a first electrode formed on the substrate; a first insulating layer formed on the first electrode; a phosphorous layer formed on the first insulating layer and having inserted therein one or more intermediate insulating layers; a second insulating layer formed on the said phosphorous layer; and a second electrode formed on the second insulating layer.

In another aspect, a color EL device includes a substrate; a first electrode formed on the substrate; a first insulating layer formed on the first electrode; a plurality of phosphorous layers and one or more intermediate insulating layers formed on the first insulating layer, such that the phosphorus layers and the intermediate insulating layers alternate and such that a phosphorus layer is on top; a second insulating layer formed on the top phosphorous layer; and a second electrode formed on the second insulating layer.

In a further aspect, a method of manufacturing a color EL device includes the steps of: providing a substrate; forming a first electrode on the substrate; forming a first insulating layer on the first electrode; forming a stacked structure having a plurality of phosphorous layers and one or more of intermediate insulating layers, with a phosphorous layer on top, on the first insulating layer; forming a second insulating layer on the top phosphorous layer; and forming a second electrode on the second insulating layer.

It is to be understood that both the foregoing general description and the following detailed description are exemplary and explanatory and are only intended to provide an explanation of the invention. The invention should be limited only by the claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 is a graph showing the leading and trailing edges that occur during operation of the conventional EL device;

FIG. 3a is a sectional view of an EL device of the present invention with a simplified portion I;

FIG. 3b is a more detailed sectional enlarged view of portion I of FIG. 3a according to the present invention.

DETAILED DESCRIPTION OF THE PREFERRED EMBODIMENTS

Figure 1:
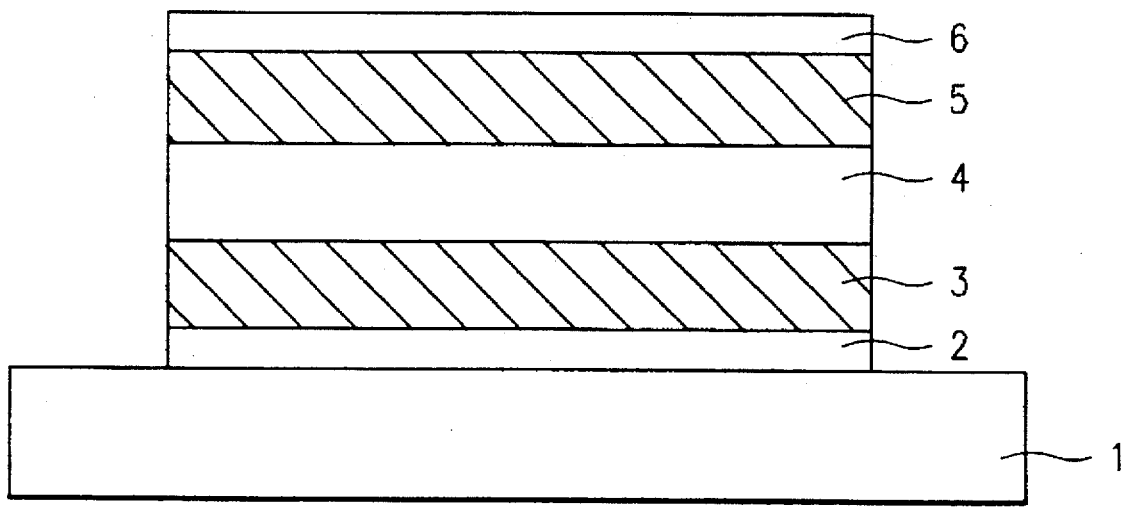
FIG. 1 is a sectional view of a conventional SrS:Ce EL display device.

Reference will now be made in detail to the preferred embodiments of the present invention, examples of which are illustrated in the accompanying drawings.

Referring to FIGS. 3a and 3b, in a color EL device of the present invention, an ITO layer 12, a transparent conductive layer, is formed on a substrate 10. A first insulating layer 14 and a phosphorus layer 16 is formed on ITO 12. The phosphorus layer 16 is actually composed of multiple phosphorous layers with intermediate insulating layers 18 disposed therein. The phosphorous layer 16, a second insulating layer 20 and an upper electrode 22 are sequentially stacked on top of the insulating layer 14.

In other words, the EL device of the present invention is constructed in such a manner that one or more of insulating layers, intermediate insulating layers 18, are inserted into phosphorous layer 16. Phosphorous layer 16 and intermediate insulating layer 18 are stacked in multiple layers, as shown in FIG. 3b. Here, intermediate insulating layers 18 are formed to be very thin. One of $Ta_2O_5$, $TiO_2$, $Y_2O_3$, $SiO_2$ and SiON is preferably selected for immediate insulating layers 18. A method of manufacturing the color EL device of the present invention will be explained below.

ITO layer 12, the transparent conducting layer, is formed on glass substrate 10, and first insulating layer 14 is formed on ITO layer 12. Phosphorous layers 16 of SrS:Ce and intermediate layers 18 are repeatedly stacked. Here, the stacked structure terminates with a phosphorous layer 16 on top.

Second insulating layer 20 and upper electrode 22 are formed sequentially on phosphorous layer 16, completing the color EL device of the present invention. The operation and effect of the color EL device of the present invention will be described below.

In the color EL device of the present invention, as shown in FIG. 3b, intermediate insulating layers 18 are inserted into phosphorous layer 16 and intermediate insulating layers 18 are stacked in multiple so that a plurality of interfaces are formed, thus increasing the magnitude of light resulting during the trailing edge.

As previously discussed, electrons are seized at the phosphorous layer/insulating layer interfaces when a voltage is applied to the EL device. In the multi-layer structure of the present invention, there are more such interfaces which serve to provide shallow interfacial states for seizing electrons during the leading edge. Therefore, after the leading edge, when the electric field of the phosphorous layer goes to zero, the more numerous electrons seized at the shallow interfacial state are re-emitted and recombined with the ionized luminescent element Ce. Therefore, the magnitude of emitted light during the trailing edge is increased to enhance the overall luminance of the device so that more light is emitted as compared with the prior art. As a result, this enables brighter luminance than that obtained by a conventional EL device.

Figure 4:
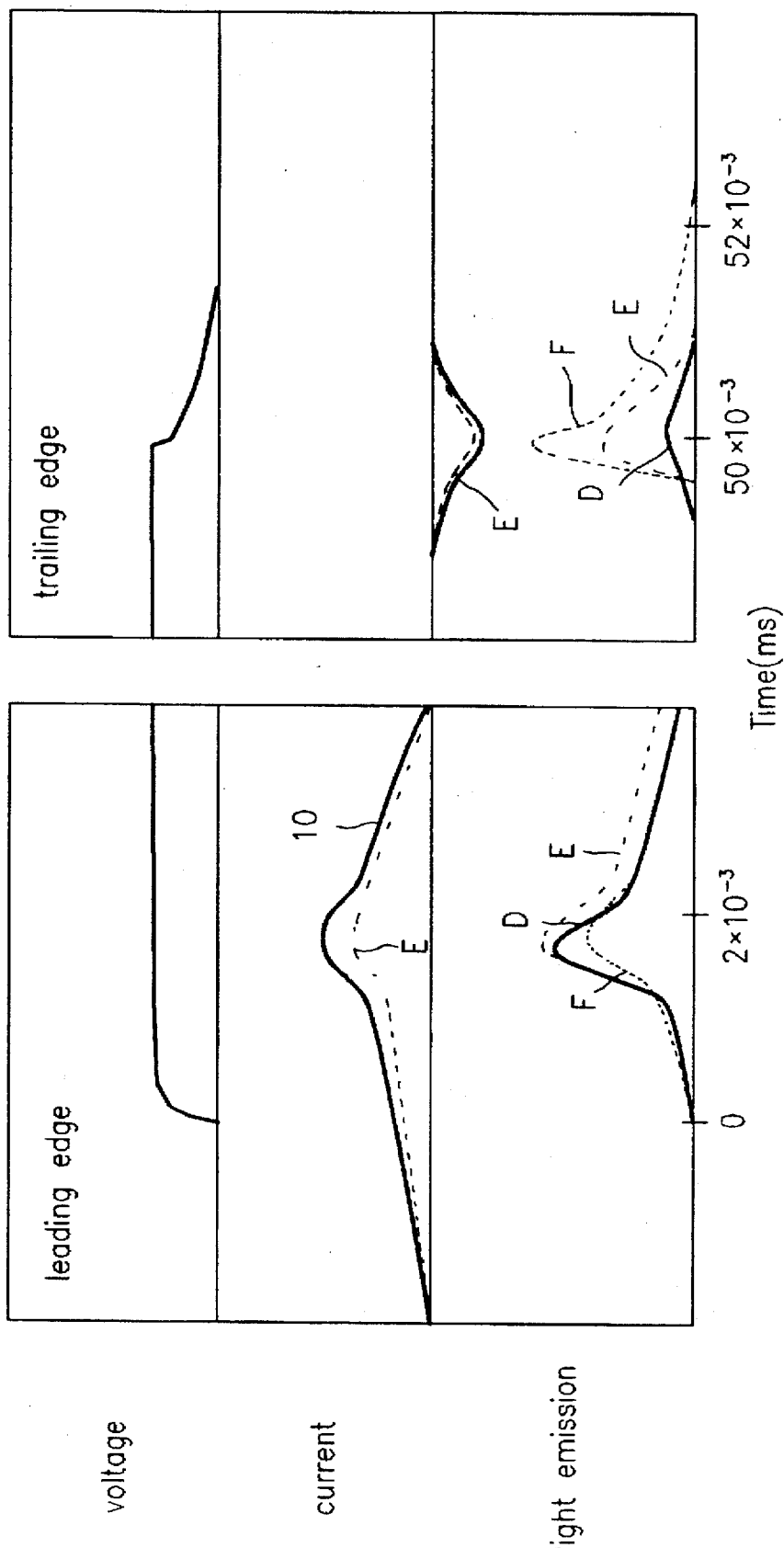
FIG. 4 is a graph showing the leading and trailing edges of the EL device of the present invention.

In FIG. 4, voltage, current and emission amount are separately shown in order to show the benefits of the invention more clearly. Reference character D indicates current value and emission amount of the prior art. Reference characters E and F represent the current value and emission amount of the present invention. Character E indicates a case in which the phosphorous layer into which the intermediate insulating layers are inserted is made in five levels. Character F indicates a case in which the phosphorous layer is formed in nine levels.

As shown in this drawing, in case of the stacked structure of the present invention, the structure stacked in nine levels emits a greater amount of light than the prior art. Note the significant difference in light emission during the trailing edge. The structure stacked in nine levels emits greater amount of light than the structure stacked in five levels.

As the phosphorous layer of the EL device is formed in more levels, the light emission amount increases and accordingly its luminance increases. As described above, according to the present invention, when an intermediate layer is inserted into the phosphorous layer and then they are stacked in multiple, more number of interfaces are formed to provide more shallow interfaces in which electrons are seized during the leading edge. When these electrons are re-emitted, recombined with the ionized luminescent center and emit during the trailing edge light, the light magnitude during the trailing edge increases, resulting in an increase of the overall amount of light emitted. This enables more luminance than that of the EL device of the prior art.

It will be apparent to those skilled in the art that various modifications and variations can be made in the color electroluminescent device and method of manufacturing the same of the present invention without departing from the spirit or scope of the invention. Thus, it is intended that the present invention cover the modifications and variations of this invention provided they come within the scope of the appended claims and their equivalents.

What is claimed is:

1. A color EL device comprising:
   a substrate;
   a first electrode formed on the substrate;
   a first insulating layer formed on the first electrode;
   a phosphorous layer formed on the first insulating layer, the phosphorous layer having inserted therein one or more intermediate insulating layers, wherein the phosphorous layer has a substantially uniform composition;
   a second insulating layer formed on the said phosphorous layer; and
   a second electrode formed on the second insulating layer.

2. A color EL device as claimed in claim 1, wherein the intermediate insulating layers are formed of one of $Ta_2O_5$, $TiO_2$, $Y_2O_3$, $SiO_2$ and SiON.

3. A color EL device as claimed in claim 1, wherein the first electrode is formed as a transparent layer.

4. A color EL device as claimed in claim 1, wherein the second electrode is formed as a transparent layer.

5. A color EL device as claimed in claim 1, wherein both the first electrode and the second electrode are formed as transparent layers.

6. A color EL device as claimed in claim 1, wherein the phosphorous layer comprises of SrS:Ce.

7. A color EL device comprising:
   a substrate;
   a first electrode formed on the substrate;
   a first insulating layer formed on the first electrode;
   a stacked structure having a plurality of phosphorous layers and one or more intermediate insulating layers formed on the first insulating layer, such that the phosphorus layers and the intermediate insulating layers alternate, wherein each of the plurality of phosphorous layers includes the same luminescent material;
   a second insulating layer formed on the top phosphorous layer; and
   a second electrode formed on the second insulating layer.

8. A color EL device as claimed in claim 7, wherein the intermediate insulating layers are formed of one of $Ta_2O_5$, $TiO_2$, $Y_2O_3$, $SiO_2$ and SiON.

9. A color EL device as claimed in claim 7, wherein the first electrode is formed as a transparent layer.

10. A color EL device as claimed in claim 7, wherein the second electrode is formed as a transparent layer.

11. A color EL device as claimed in claim 7, wherein both the first electrode and the second electrode are formed as transparent layers.

12. A color EL device as claimed in claim 7, wherein the phosphorous layer comprises SrS:Ce.

13. A color EL device as claimed in claim 7, wherein a phosphorous layer is on top of the stacked structure.

14. A method of manufacturing a color EL device comprising the steps of:
   providing a substrate;
   forming a first electrode on the substrate;
   forming a first insulating layer on the first electrode;
   forming a stacked structure on the first insulating layer, the stacked structure having a plurality of phosphorous layers and one or more of intermediate insulating layers, wherein each of the plurality of phosphorous layers includes the same luminescent material;
   forming a second insulating layer on the top phosphorous layer; and
   forming a second electrode on the second insulating layer.

15. A method of manufacturing a color EL device as claimed in claim 14, wherein the first electrode is formed as a transparent layer.

16. A method of manufacturing a color EL device as claimed in claim 14, wherein the second electrode is formed as a transparent layer.

17. A method of manufacturing a color EL device as claimed in claim 14, wherein both the first electrode and the second electrode are formed as transparent layers.

18. A method of manufacturing a color EL device as claimed in claim 14, wherein the phosphorous layer comprises SrS:Ce.

19. A method of manufacturing a color EL device as claimed in claim 14, wherein the intermediate insulating layers are formed of one of $Ta_2O_5$, $TiO_2$, $Y_2O_3$, $SiO_2$ and SiON.

20. A method of manufacturing a color EL device as claimed in claim 14, wherein a phosphorous layer is on top of the stacked structure.

* * * * *